UNITED STATES PATENT OFFICE.

ROBERT T. FRAZIER, JR., OF WASHINGTON, DISTRICT OF COLUMBIA, ASSIGNOR OF ONE-HALF TO FRANK SHUMAN, OF TACONY, PHILADELPHIA, PENNSYLVANIA.

TELAUTOGRAPH.

1,035,568.  Specification of Letters Patent.  Patented Aug. 13, 1912.

Application filed August 17, 1908. Serial No. 448,925.

*To all whom it may concern:*

Be it known that I, ROBERT T. FRAZIER, Jr., a citizen of the United States, residing in the city of Washington, District of Columbia, have invented certain new and useful Improvements in Telautographs, of which the following is a specification.

My invention consists of a simple and accurate form of telautograph, the operation of which is based upon the principle that a current of electricity will be induced in a hollow coil of wire by a solenoid magnet in direct proportion to the depth of penetration of the latter into the bore of the former, and upon the further principle that any known character or combination of lines can be produced by three motions, which may, for convenience, be termed longitudinal, corresponding to the motion from top to bottom of the character, lateral, corresponding to motion from side to side of the character, and vertical, corresponding to the motion whereby the pen, pencil, stylus, or other inscribing instrument, (hereinafter, for convenience, termed the "stylus") is lifted from the paper or other surface upon which the character is being formed. In adapting these principles to the purposes of a telautograph I connect the stylus of the transmitting instrument to three primary magnets, susceptible, respectively, of longitudinal, lateral and vertical movement, each movement of the stylus varying the relation of the corresponding primary magnet in respect to a secondary magnet and consequently varying the strength of the current induced in the latter. These secondary currents are transmitted to magnets at the receiving station, these magnets having armatures which are connected to the reproducing stylus in the same manner that the primary magnets are connected to the inscribing stylus of the transmitting instrument, and said armatures being attracted by the magnets of the receiving instrument in direct ratio to the strength of the secondary current induced in the corresponding magnet of the transmitting instrument, whereby the movements of both transmitting and receiving styluses will be precisely alike.

Many different combinations of mechanical devices may be employed in the construction of an instrument embodying my invention, and in the accompanying drawings I have illustrated one convenient and simple combination of devices for the purpose.

Figure 1:
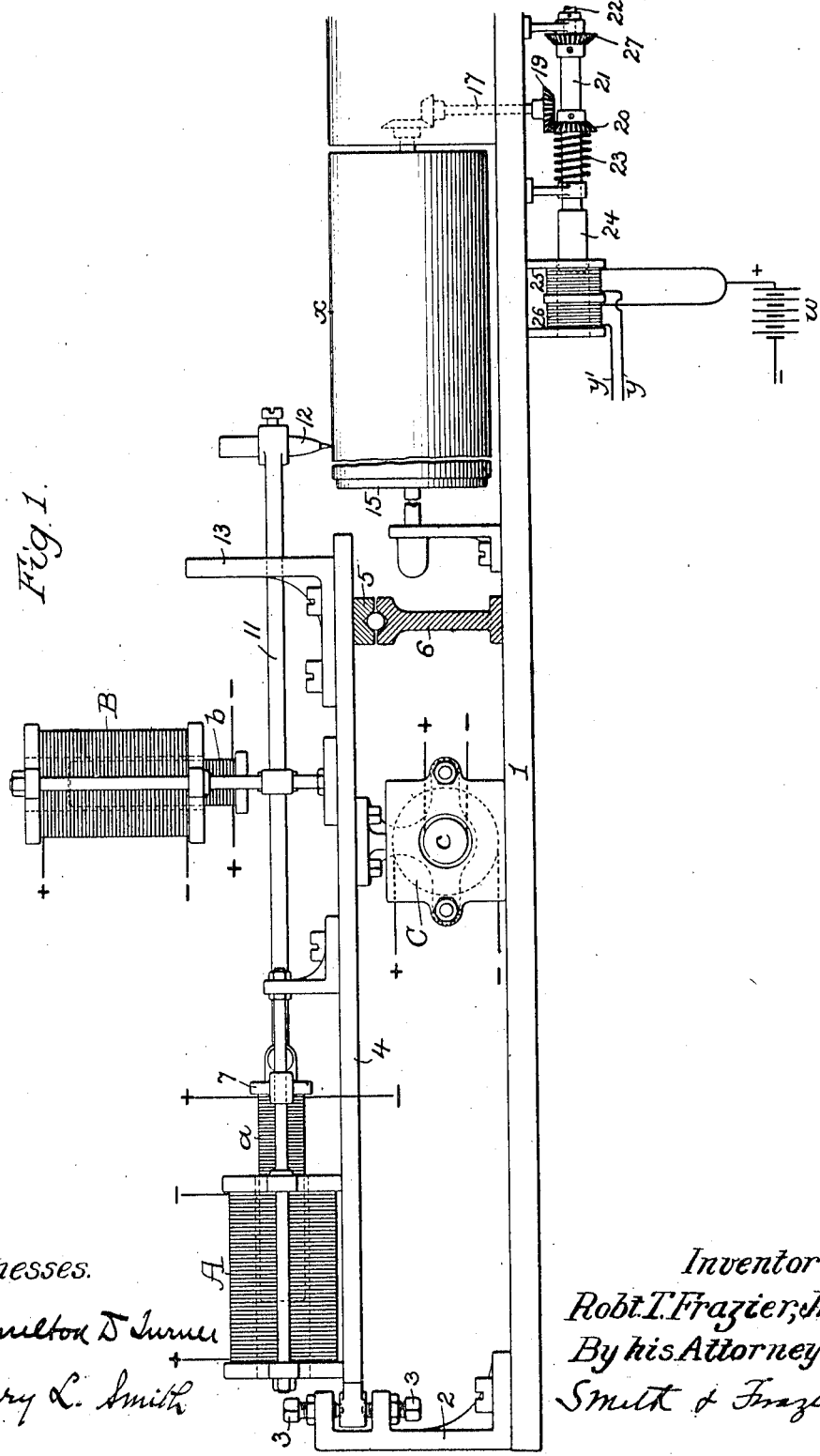
Figure 2:
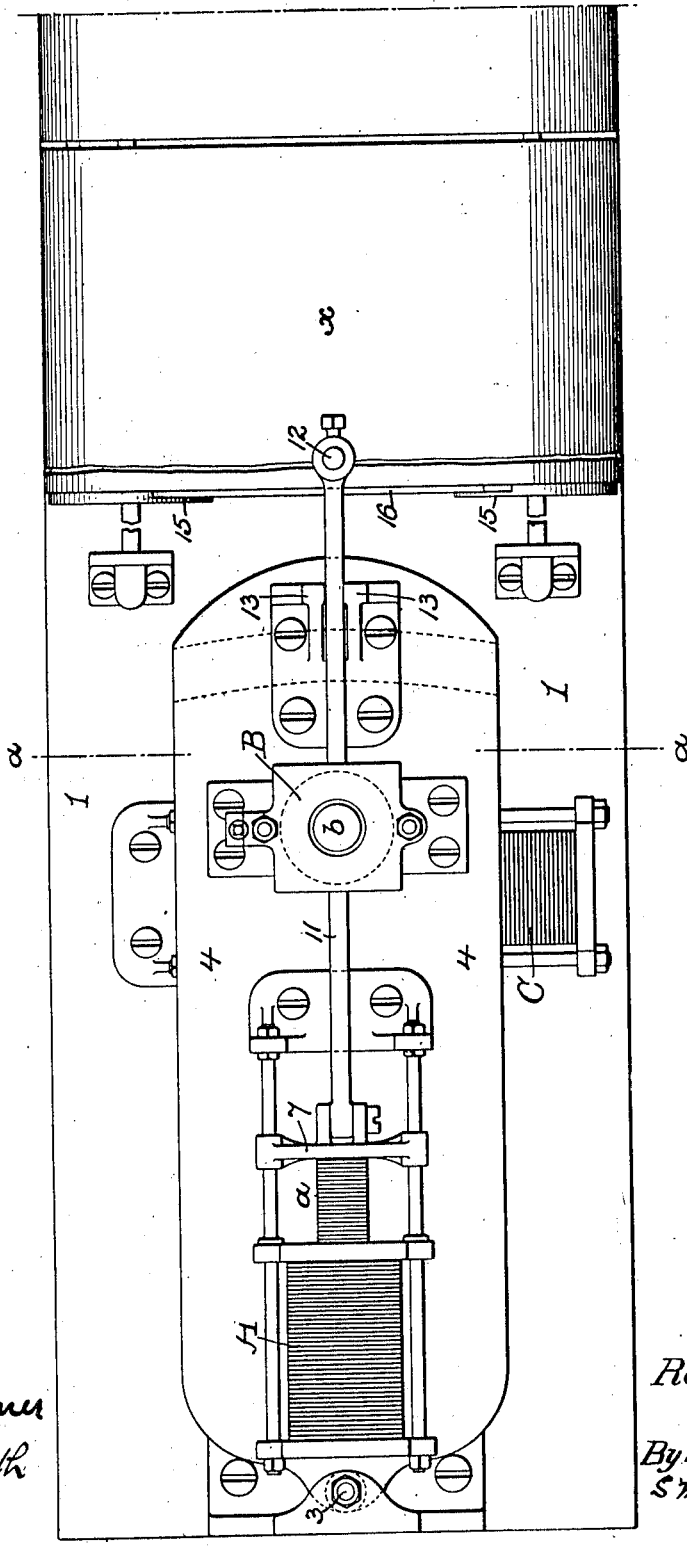
Figure 3:
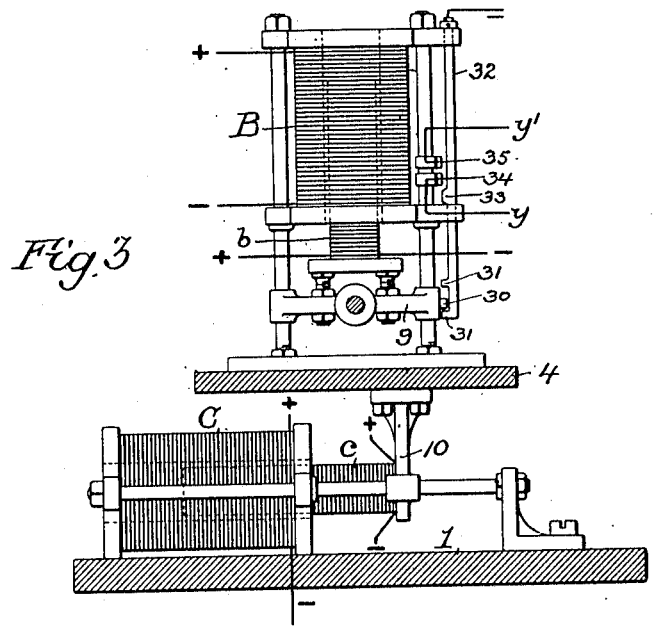

Figure 1 representing a side view of the apparatus, partly in section; Fig. 2 a top or plan view of the same; Fig. 3 a transverse section on the line $a$—$a$, Fig. 2, and Fig. 4 a diagrammatic illustration of one system of electric circuits which may be employed in carrying out my invention.

In the drawings, 1 represents a base board or table upon which the apparatus is mounted, this table having, at one end, a bracket 2 carrying pins 3 upon which is pivotally mounted, so as to swing transversely, a table 4 whose outer or free end has, on the under side, a grooved track 5 running on balls or rollers which are mounted in a grooved rail 6 on the table 1, both track and rail being curved to accord with the arc of a circle having its axis at the pivot pins 3. Rigidly mounted on the table 4 is a horizontal, longitudinal, hollow conducting coil A and a vertical hollow conducting coil B, a smaller conducting coil $a$ being adapted to play freely in the bore of the coil A and a like coil $b$ being adapted to play freely in the bore of the coil B. Rigidly mounted on the table 1, below the swinging table 4, is another hollow conducting coil C to the bore of which is adapted a smaller conducting coil $c$, as shown in Fig. 3. The coil $a$ is connected to a longitudinally guided cross head 7, the coil $b$ to a vertically guided cross head 9, and the coil $c$ to a laterally guided cross head 10.

A stylus-carrying arm 11 is pivoted to the cross head 7 in such manner that the said arm is free to swing in a vertical plane in order to permit the stylus 12 at the outer end of the arm to be raised from or applied to the paper or other surface upon which a letter or other character is to be inscribed. The stylus arm 11 engages the cross head 9, as shown in Fig. 3, in order to impart to the coil $b$ any vertical movements of said arm, and the latter fits between vertical guides 13 on the swinging table 4, in order that any lateral movement of the arm will be transmitted to said table and thence, through the medium of the cross head 10, to the coil $c$. Each of the coils $a$, $b$ and $c$ will therefore receive its component part of the compound movement necessary to form a letter or other character by means of the stylus 12, the coil $a$ receiving the longitudinal component, the coil $b$ the vertical component, and the coil $c$ the lateral component, and, when said coils $a$, $b$ and $c$ are properly energized, the currents induced in the secondary coils A, B and C will vary in direct proportion to the extent of penetration of the coils $a$, $b$ and $c$ into their respective secondary coils, and if these currents are transmitted to the corresponding coils of a receiving instrument similar in construction to the transmitter the stylus of said receiving instrument will have imparted to it movements precisely similar to those of the stylus of the transmitter, and any character produced by the stylus of the transmitting instrument will be accurately reproduced by the stylus of the receiving instrument.

Figure 4:
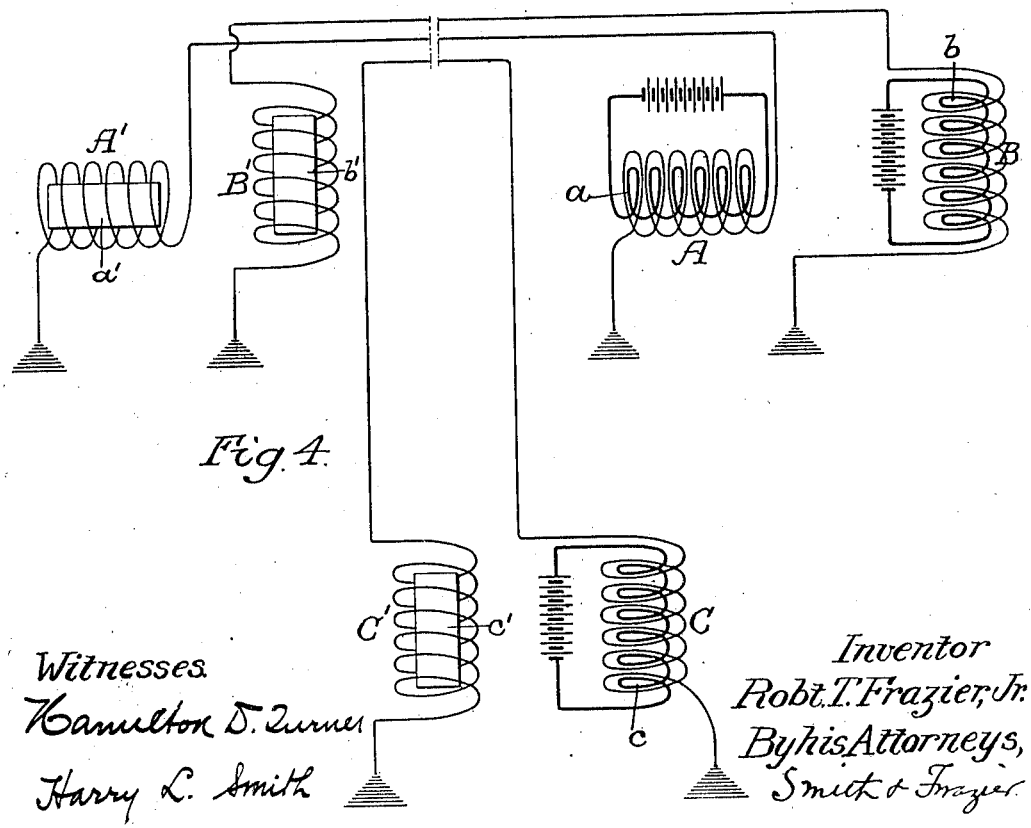

Any known means of transmitting the electrical currents from the coils of the transmitter to those of the receiver may be adopted within the scope of my invention, and in Fig. 4 I have illustrated, in diagram, one system of electric circuits which may be employed, A, B and C representing the secondary coils of the transmitting instrument, A′, B′ and C′ corresponding coils of the receiving instrument, $a$, $b$ and $c$ the primary coils of the transmitting instrument, and $a'$, $b'$ and $c'$ the corresponding armatures of the receiving instrument, one pole of each of the coils A, B and C and A′, B′ and C′ being grounded and the other poles of the respective pairs of coils being connected by suitable line wires. In this diagram I have shown a separate battery for each of the primary coils $a$, $b$ and $c$ but said coils may, if desired, be connected to a single battery or other current generator.

The surface $x$ upon which the stylus acts is, in the present instance, an endless strip or apron of paper or other suitable material passing over opposite drums 15 and supported upon a table 16 disposed between said drums, so that, in writing, the hand which manipulates the stylus may occupy a substantially fixed position, the paper traveling beneath the stylus instead of the stylus being carried over the paper, whereby the lateral movements of the stylus are relatively slight.

The shaft which carries the driving drum 15 is geared to a vertical shaft 17, and the latter has a bevel wheel 19 which is normally in gear with a bevel wheel 20 on a sleeve 21 free to move longitudinally on a driving shaft 22 to which rotative movement may be imparted in any suitable manner. The bevel wheel 20 is maintained normally in mesh with the bevel wheel 19 by means of a coiled spring 23, but the sliding sleeve 21 terminates in a core 24 adapted to the bore of a pair of electro-magnetic coils 25 and 26 disposed one in advance of the other. The sleeve 21, although capable of sliding on the driving shaft 22, is compelled to turn with the same and is provided with a second bevel wheel 27, so disposed in respect to the bevel wheel 20 that when the sleeve 21 is moved to a certain extent against the action of the spring 23 by the action of the coil 25 on the core 24 the bevel wheel 20 will be moved out of mesh with the bevel wheel 19 and rotation of the shaft 17, and consequently of the paper feeding drum, will be stopped, further movement of the sleeve 21 in the same direction bringing the bevel wheel 27 into mesh with the bevel wheel 19 and effecting reverse movement of the apron feeding drums, so that after a line has been written of the full length of the band or apron the direction of movement of the latter may be reversed and a new line started, the shifting of the band or apron to effect the proper spacing of the lines being effected either by hand or by suitable mechanical devices.

In order that the movements of the band or apron $x$ may be under the control of the stylus-carrying arm 11, the cross head 9 which engages said arm has a lug 30, which plays between lugs 31 on a bar 32 vertically guided alongside of the magnet B and having a lug 33 which serves to establish electrical connection between the bar 32 and either or both of a pair of sleeves 34 and 35 mounted on the frame which carries the coil B but insulated from one another.

One terminal of each of the coils 25 and 26 is connected to one pole, say the positive pole, of a battery $w$ or other electric current generator whose other pole is connected to the bar 32, the opposite terminal of the coil 25 being connected by a wire $y$ to the lower sleeve 34 and that of the coil 26 by a wire $y'$ to the upper sleeve 35.

The normal position of the bar 32 is that represented in Fig. 3, the lug 33 being free from contact with either of the sleeves 34 and 35. Normal lifting movement of the sleeve such as that likely to be required in the operation of writing or drawing will not affect this normal position of the bar 32, the lug 30 on the cross head 9 traveling between the lugs 31 of the bar, but a slight additional rise of the stylus will cause such lifting movement of the bar 32 as to bring its lug 33 into contact with the lower sleeve 34, thereby completing the electrical circuit through the coil 25 and causing such attraction of the core 24 as will withdraw the bevel wheel 20 from engagement with the bevel wheel 19 and thereby arrest the movement of the band or apron $x$. A still further lift of the stylus will bring the lug 33 of the bar 32 into contact with both of the sleeves 34 and 35, thereby energizing both of the coils 25 and 26 and causing such an attraction of the core 24 as will bring the bevel wheel 27 into mesh with the bevel wheel 19 and cause reversal in the direction of movement of the band or apron $w$, lowering the stylus causing first a cessation of the reverse movement and then a resumption of the forward movement. The stylus may, however, act upon a laterally stationary surface to produce a line of a length dependent upon the length of travel of the coil $c$, being carried back of the starting point after the completion of the line, the spacing of the lines being effected either by movement of the receiving surface in respect to the stylus or by successive longitudinal movements of the latter within the limit of the length of travel of the coil $a$.

I claim:

1. In a telautograph, transmitting and receiving stations each equipped with a stylus, a plurality of pairs of electric coils disposed in different angular relations to said stylus, and connections whereby movement of one coil of each pair in respect to the other coil of the pair is controlled by the movement of the stylus, in combination with a plurality of electric circuits each connecting one of the coils of a pair at the transmitting station to a coil of the corresponding pair at the receiving station.

2. In a telautograph, the combination of a stylus, a plurality of pairs of electric coils disposed in different angular relations to said stylus and one pair at a right angle to the other pair, and a stylus bar connected at one end to the stylus and at the opposite end to a coil of one pair, said stylus bar, at a point between its ends, passing through and being longitudinally movable in a cross head which is connected to a coil of the other pair.

3. In a telautograph, the combination of a stylus, two pairs of electric coils disposed in different angular relations to the stylus and one pair at a right angle to the other pair, a laterally swinging table carrying said pairs of coils, a third pair of electric coils disposed at a right angle to each of the first two pairs and having its movable coil connected to said laterally swinging table, and a stylus carrying bar connected at one end to the movable coil of the first pair and engaging a cross head which is connected to the movable coil of the second pair.

4. In a telautograph, the combination of a stylus, a plurality of pairs of electric coils disposed in different angular relations to said stylus, and connections whereby movement of one coil of each pair in respect to the other coil of the pair is controlled by the movement of the stylus.

5. In a telautograph, the combination of a movable transcribing surface, a movable stylus, and means whereby a partial lift of said stylus is caused to effect stoppage in the movement of the transcribing surface, and a further lift is caused to effect reversal of such movement, substantially as described.

6. In a telautograph, the combination of a movable transcribing surface, a movable stylus, and means whereby vertical movement of said stylus will effect stoppage or reversal in the direction of movement of the transcribing surface, said means providing a certain amount of lost motion of the stylus before any control of the direction of movement of the transcribing surface is effected.

In testimony whereof, I have signed my name to this specification, in the presence of two subscribing witnesses.

ROBERT T. FRAZIER, JR.

Witnesses:
R. T. FRAZIER,
VIRGINIA TIFFANY.

---

Copies of this patent may be obtained for five cents each, by addressing the "Commissioner of Patents, Washington, D. C."